United States Patent [19]  
Klinkenberg

[11] 4,177,690  
[45] Dec. 11, 1979

[54] BALL SCREW AND NUT
[75] Inventor: Hubert E. Klinkenberg, Rochester, Mich.
[73] Assignee: Beaver Precision Products, Inc., Beloit, Wis.
[21] Appl. No.: 880,088
[22] Filed: Feb. 22, 1978
[51] Int. Cl.² ............................................. F16H 1/18
[52] U.S. Cl. ................... 74/424.8 R; 74/441; 74/459
[58] Field of Search ........ 74/459, 424.8 R, 424.8 NA, 74/441

[56] References Cited
U.S. PATENT DOCUMENTS

| 2,959,978 | 11/1960 | Boutwell | 74/459 |
| 3,369,422 | 2/1968 | Sears | 74/424.8 R |
| 3,665,782 | 5/1972 | Loftus | 74/424.8 R |
| 3,722,312 | 3/1973 | Better et al. | 74/459 |

FOREIGN PATENT DOCUMENTS 866286   2/1953   Fed. Rep. of Germany ... 74/424.8 NA

OTHER PUBLICATIONS

Saginaw Steering Gear Division of General Motors Corp. Catalog, Sep. 1960, p. 16.

Primary Examiner—C. J. Husar
Assistant Examiner—Conrad Berman
Attorney, Agent, or Firm—Leydig, Voit, Osann, Mayer & Holt, Ltd.

[57] ABSTRACT

A ball screw and nut mechanism in which a preloaded train of balls travels through a closed circuit having an active portion and an inactive or return portion. The active portion is formed by convolutions of opposed helical grooves in the screw and the nut and a return tube on the nut defines the inactive portion. Inclined surfaces are formed on the lands between adjacent convolutions of the groove on the screw and partially unload the balls as the latter enter and leave the active portion of the circuit to prevent the balls from keystoning.

3 Claims, 3 Drawing Figures

BALL SCREW AND NUT

BACKGROUND OF THE INVENTION

This invention relates to a ball screw and nut mechanism which includes an elongated screw loosely received within the bore of a nut and opposing helical grooves are formed on the screw and in the bore of the nut. A train of balls travels in one or more convolutions of the grooves which constitute the active portion of a closed circuit. The latter is completed by a return tube which is on the nut and which defines the inactive portion of the circuit. The lead of the groove on the nut is shifted slightly from the lead of the groove on the screw so that the mechanism is preloaded.

SUMMARY OF THE INVENTION

The principal object of the present invention is to provide a ball screw and nut mechanism of the foregoing type with a novel means for partially unloading the balls as they enter and leave the active portion of the closed circuit whereby the balls travel a true circuit and do not keystone.

A more detailed object is to achieve the unloading through the use of inclined surfaces between the walls of the groove on the screw and the lands which separate the adjacent convolutions of the groove.

DETAILED DESCRIPTION OF THE PREFERRED EMBODIMENT

Figure 1:
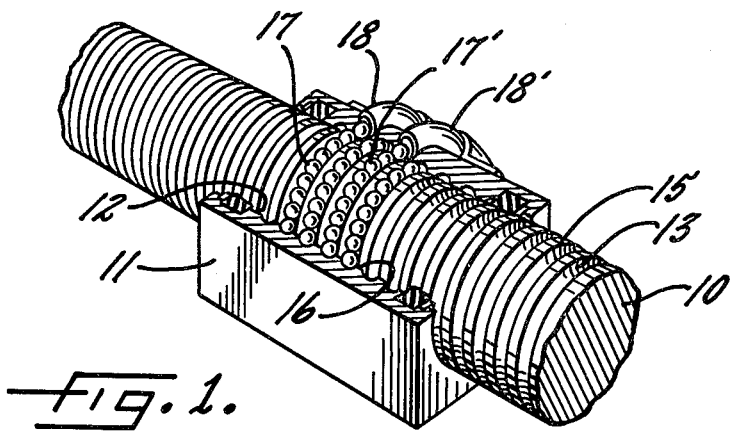
FIG. 1 is a fragmentary perspective view of a ball screw and nut mechanism embodying my invention, parts being broken away and shown in section.

As shown in the drawings for purposes of illustration, the invention is embodied in a ball screw and nut mechanism comprising a screw 10 and a nut 11 threaded on the screw for relative movement longitudinally of the latter as the screw and the nut are turned relative to each other. Depending upon the particular application of the mechanism, either the screw or the nut may be turned and herein the mechanism is described in an application where the screw is turned the the nut moves back and forth axially along the screw.

Figure 3:
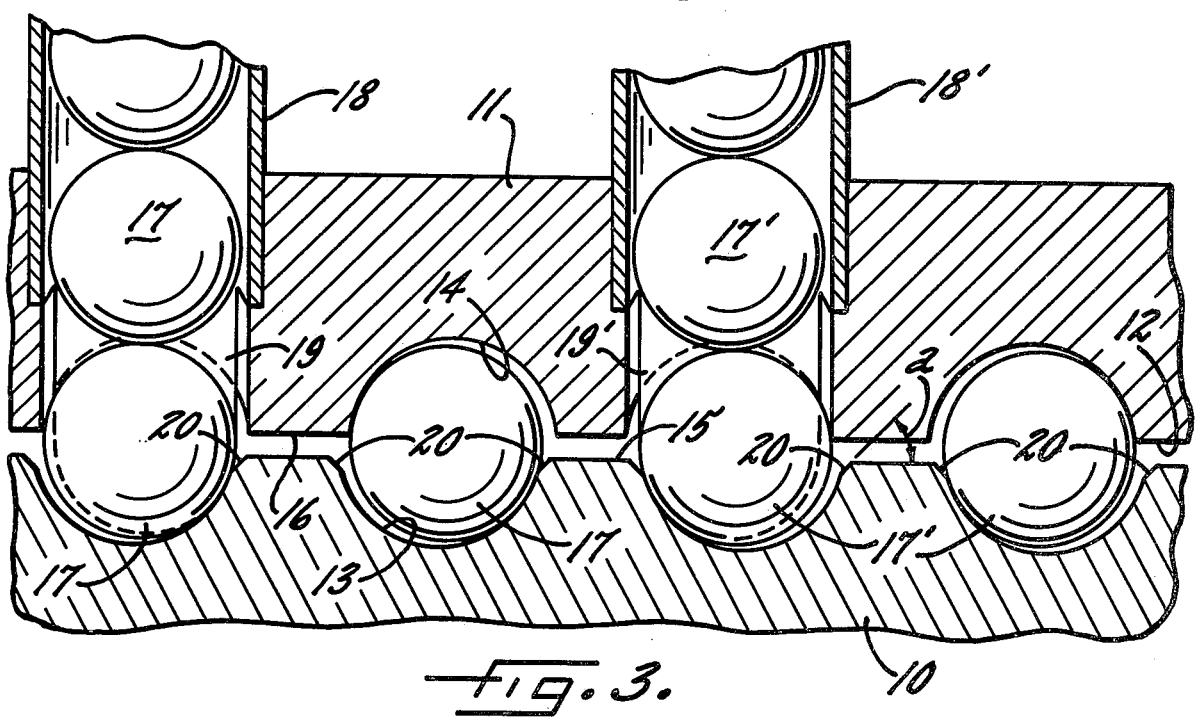
FIG. 3 is an enlarged fragmentary sectional view taken along the line 3—3 in FIG. 2.

To advance the nut 11 as the screw 10 is turned, the screw is received loosely in an internal bore 12 (FIG. 3) with helical grooves 13 and 14 formed respectively in the opposing surfaces of the screw and the bore 12. The groove 13 in the screw is generally semi-circular in cross section with flat lands 15 between adjacent convolutions of the groove and the groove 14 in the wall of the bore 12 is similarly shaped with flat lands 16 between its adjacent convolutions. At least one and preferably a plurality of trains of balls are received in the grooves 13 and 14 and, in the present instance, there are two such trains 17 and 17' with each train occupying approximately two adjacent convolutions of the grooves 13 and 14.

Figure 2:
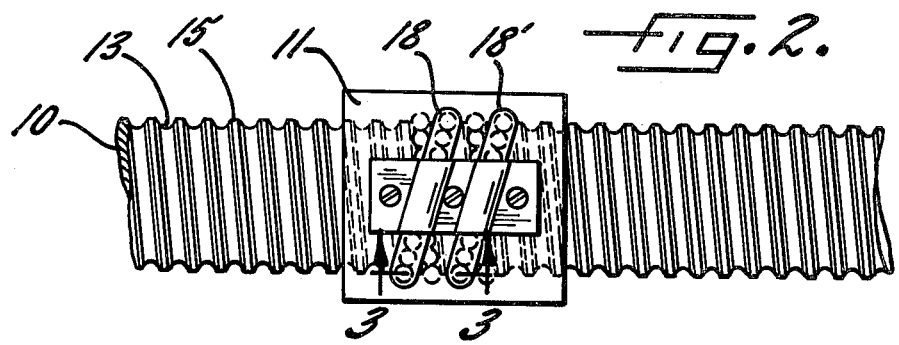
FIG. 2 is a fragmentary plan view of the mechanism.

Each train of balls 17 and 17' travels in a closed circuit which is defined by the two convolutions of the grooves 13 and 14 and passages or return tubes 18 and 18' on the nut 11. As shown in FIG. 2, the return tube 18 extends reversely relative to the helixes of the grooves 13 and 14 with one end of the tube opening through one convolution of the nut groove 14 and the other end opening through the adjacent convolution. Thus, each ball 17 rolls from one end of the return tube 18 through the grooves 13 and 14 to the other end of the tube and this is the active portion of the circuit. The balls then enter the return tube and travel through the tube back to the beginning of the active portion, the return tube constituting the inactive portion of the closed circuit. The return tube 18' for the train of balls 17' is similarly arranged.

Pick-up fingers 19 (FIG. 3) rigid with the return tube 18 project from the ends of the tube and into the groove 13 and the screw 10, each finger being sized and shaped so that there is a clearance between the end portion of the finger and the bottom and sides of the groove. As the nut 11 is turned relative to the screw 10 in one direction, the balls 17 move in one direction along the active portion of their closed circuit such as from left to right as viewed in FIG. 3. In such a case, when each ball reaches the right end of the active portion, it is engaged by the finger 19 on the right (not shown) which guides the ball out of the grooves 13 and 14 and into the return tube 18. The balls then travel back through the return tube until the other finger 19 guides the ball back into the active portion. When the nut 11 is turned in the opposite direction, the balls travel in the opposite direction and the functions of the fingers 19 are reversed. Similar fingers 19' are formed on the returned tube 18'.

As is conventional with ball screw mechanisms of this type, the balls 17 and 17' are preloaded when traveling in the grooves 13 and 14 to eliminate play between the screw 10 and the nut 11 and to reduce axial deflection resulting from external thrust loads. To accomplish this, the lead of the groove 14 in the nut 11 is shifted slightly relative to the lead of the groove 13 in the screw 10 with the lead of the convolutions forming the closed circuit for the balls 17 being shifted in one direction and the convolutions forming the closed circuit for the balls 17' being shifted in the opposite direction. As a result, the balls 17 bear against one side wall of the groove 13 and the opposite side wall of the groove 14 (see FIG. 3) while the balls 17' bear against the reverse side walls of the grooves 13 and 14. Thus, play between the nut and the screw is eliminated in both directions of travel of the nut.

With prior mechanisms of the foregoing type, difficulty has been encountered as the balls enter and leave the active portions of their closed circuits. Because of the preloading, the balls tend to deviate from a true circuit near the ends of the return tubes and this can result in what is known in the art as keystoning which, in turn, causes the balls to jam in the circuit. The present invention contemplates an arrangement in which the balls are slightly unloaded as they enter and leave the active portions of the circuits and this eliminates the keystoning effect. More specifically, according to the invention, inclined or beveled surfaces 20 (FIG. 3) are formed on the screw 10 between the tops of the lands 15 and the side walls of the groove 13 whereby the spaces provided by the surfaces 20 permit the partial unloading of the balls.

The angle a which each surface 20 makes with the adjacent land 15 and hence with the axis of the screw 10 should be between 30 and 60 degrees. A smaller angle does not effectively unload the balls and a larger angle results in such a reduction in the size of the side wall of the groove 13 that there is insufficient bearing support for the balls. An angle in the range of 45 to 50 degrees has been found to be most desirable.

I claim:

1. In a helical ball screw and nut mechanism, the combination of, a screw having an external helical ball groove of generally semi-circular cross-section, lands formed on said screw and separating adjacent convolutions of said groove, a nut telescoped on said screw and having an internal helical ball groove registering with the groove in said screw to define a ball path, said nut having a return passage having two ends each communicating with said path, the ends of said passage being spaced axially from each other whereby the passage and the portion of the path between said ends define a closed circuit with the path forming the active portion of the circuit and the passage forming the inactive portion, a plurality of balls disposed in and filling said circuit and the nut and screw being preloaded whereby the balls in said active portion bear against one side wall of the generally semi-circular cross section of the groove in said screw and against the opposite side wall of the groove in said nut, and inclined surfaces between the tops of said lands and the side walls of the groove in said screw to unload said balls as the balls travel into and out of said active portion of said circuit, said surfaces being inclined relative to the axis of said screw at an acute angle in the range of 30 to 60 degrees.

2. In a helical ball screw and nut mechanism the combination of, a screw having an external helical ball groove of generally semi-circular cross-section, lands formed on said screw and separating adjacent convolutions of said groove, a nut telescoped on said screw having an internal helical ball groove registering with the groove in said screw and of similar generally semi-circular cross-section to define a ball path, said nut having a return passage having two ends each communicating with said path, the ends of said passage being spaced axially from each other whereby the passage and the portion of the path between said ends define a closed circuit with the path forming the active portion of the circuit and the passage forming the inactive portion, a plurality of balls disposed in and filling said circuit with the nut and screw being preloaded whereby the balls in said active portion bear against one side wall of the generally semi-circular cross-section of the groove in said screw and against the opposite and similar side wall of the groove in said nut, two fingers rigid with said nut with one adjacent each end of said passage and projecting into the groove in said screw to guide balls into and out of the passage, and flat surfaces between the tops of said lands and the side walls of the groove in said screw and inclined at an acute angle relative to the axis of said screw to unload said balls as the balls travel into and out of said active portion of said circuit, said acute angle being between 30 and 60 degrees.

3. The combination as defined in claim 1 or 2 wherein said angle is between 45 and 50 degrees.

* * * * *